United States Patent
Chandrahalim et al.

(10) Patent No.: US 11,366,054 B2
(45) Date of Patent: Jun. 21, 2022

(54) NONCONTACT LIQUID CRYSTALLINE BROADBAND OPTOACOUSTIC SENSORS

(71) Applicant: US Govt as represented by Secretary of Air Force, Wright-Patterson AFB, OH (US)

(72) Inventors: Hengky Chandrahalim, Beavercreek, OH (US); Michael Dela Cruz, Beavercreek, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 330 days.

(21) Appl. No.: 16/782,608

(22) Filed: Feb. 5, 2020

(65) Prior Publication Data
US 2020/0256787 A1    Aug. 13, 2020

Related U.S. Application Data

(60) Provisional application No. 62/803,630, filed on Feb. 11, 2019, provisional application No. 62/803,652, (Continued)

(51) Int. Cl.
G01N 21/17    (2006.01)
G01N 29/24    (2006.01)

(52) U.S. Cl.
CPC ..... *G01N 21/1702* (2013.01); *G01N 29/2418* (2013.01); *G01N 2201/0635* (2013.01); *G01N 2201/06113* (2013.01)

(58) Field of Classification Search
CPC .......... G01N 29/2418; G01N 29/2425; G01N 29/346; G01N 21/1702; G01N 21/1704;
(Continued)

(56) References Cited

U.S. PATENT DOCUMENTS

| 2002/0136524 A1* | 9/2002 | Agha Riza ....... H04B 10/25073 385/140 |
| 2008/0310470 A1* | 12/2008 | Ooi ........................ H01S 5/341 438/46 |
| 2016/0370625 A1* | 12/2016 | Fontecchio .............. G03H 1/04 |

OTHER PUBLICATIONS

G. P. Crawford, A. Schenning, and D. J. Broer, Liquid Crystal Sensors. Taylor & Francis Group, 6000 Broken Sound Parkway NW, Suite 300, Boca Raton, FL 33487-2742: CRC Press, 2017.
(Continued)

*Primary Examiner* — Suman K Nath
(74) *Attorney, Agent, or Firm* — AFMCLO/JAZ; David E. Franklin (57) ABSTRACT

An optoacoustic sensor includes a liquid crystal (LC) cell formed between top and bottom plates of transparent material. A transverse grating formed across the LC cell that forms an optical transmission bandgap. A CL is aligned to form a spring-like, tunable Bragg grating that is naturally responsive to external agitations providing a spectral transition regime, or edge, in the optical transmission bandgap of the transverse grating that respond to broadband acoustic waves. The optoacoustic sensor includes a narrowband light source that is oriented to transmit light through the top plate, the LC cell, and the bottom plate. The optoacoustic sensor includes an optoacoustic spectrometer that is oriented below the bottom plate to receive the transmitted light and to record a time-domain modulation of transmission intensity at a selected one of a falling and rising edge of the transmission bandgap for detecting analog acoustic vibration.

7 Claims, 8 Drawing Sheets

Related U.S. Application Data filed on Feb. 11, 2019, provisional application No. 62/964,752, filed on Jan. 23, 2020.

(58) Field of Classification Search
CPC ........... G01N 21/1706; G01N 21/1714; G01N 2201/06113; G01N 2201/0635
See application file for complete search history.

(56) References Cited

OTHER PUBLICATIONS

L. Wang, A. M. Urbas, and Q. Li, "Nature-Inspired Emerging Chiral Liquid Crystal Nanostructures: From Molecular Self-Assembly to DNA Mesophase and Nanocolloids," Adv. Mater., p. 1801335, Aug. 2018.
H. K. Bisoyi and Q. Li, "Light-Directing Chiral Liquid Crystal Nanostructures: From 1D to 3D," Acc. Chem. Res., vol. 47, No. 10, pp. 3184-3195, Oct. 2014.
K. H. Kim et al., "Air-coupled ultrasound detection using capillary-based optical ring resonators," Sci. Rep., vol. 7, No. 1, p. 109, Dec. 2017.
K. H. Kim, W. Luo, C Zhang, C Tian, L. J. Guo, X. Wang, and X. Fan, "Air-coupled ultrasound detection using capillary-based optical ring resonators," Sci Rep, vol. 7, pp. 109, 2017.
X. Qiao, X. Zhang, Y. Guo, S Yang, Y Tian, and Y. Meng, "Boundary layer viscosity of CNT-doped liquid crystals effects of phase behavior," Rheol. Acta, vol. 52, pp. 939, 2013.
Q. Ni, T. Marschke, S. Steele, N. Seyed, and N. B. Crane, "Studying of Contact Angle Friction and Contact Angle Hysteresis (CAM) Though Force Measurements," In ASME 2012 International Mechanical Engineering Congress and Exposition, pp. 721, 201.

* cited by examiner

NONCONTACT LIQUID CRYSTALLINE BROADBAND OPTOACOUSTIC SENSORS

CROSS-REFERENCE TO RELATED APPLICATIONS

This application claims the benefit of priority under 35 U.S.C. § 119(e) to U.S. Provisional Application Ser. No. 62/803,630 entitled "Noncontact Liquid Crystalline Broadband Optoacoustic Sensors," filed 11 Feb. 2019, the contents of which are incorporated herein by reference in their entirety. This application claims the benefit of priority under 35 U.S.C. § 119(e) to U.S. Provisional Application Ser. No. 62/803,652 entitled "Statistically-Designed Liquid Crystalline Molecular Cell Sensors," filed 11 Feb. 2019, the contents of which are incorporated herein by reference in their entirety. This application claims the benefit of priority under 35 U.S.C. § 119(e) to U.S. Provisional Application Ser. No. 62/964,752 entitled "Noncontact Liquid Crystalline Broadband Optoacoustic Sensors," filed 23 Jan. 2020, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, an optoacoustic sensor includes a liquid crystalline (LC) cell formed between top and bottom plates. The optoacoustic sensor includes a transverse grating formed across the LC cell that forms an optical transmission bandgap. An LC including a selected one of: (i) a cholesteric liquid crystal (CLC); (ii) a doped liquid crystal (DLC) fills the CL cell. The CL is aligned to form a spring-like, tunable Bragg grating that is naturally responsive to external agitations providing a spectral transition regime, or edge, in the optical transmission bandgap of the transverse grating that respond to broadband acoustic waves. The optoacoustic sensor includes a narrowband light source that is oriented to transmit light through the top plate, the LC cell, and the bottom plate. The optoacoustic sensor includes an optoacoustic spectrometer that is oriented below the bottom plate to receive the transmitted light and to record a time-domain modulation of transmission intensity at a selected one of a falling and rising edge of the transmission bandgap for detecting analog acoustic vibration.

The present disclosure provides the first possible realization of chip-scale LC optoacoustic sensors that have the capability of detecting broadband acoustic signals via free-space coupling using white light input. The interaction between acoustic waves and the optical and mechanical properties of the LC molecular cavities was investigated. Systematic comparisons between a commercially available acoustic sensor system and the geometry-independent LC optoacoustic sensors are provided. This work will enable economical, compact, reliable, broadband, noncontact, and sensitive molecular-based acoustic sensors for use in various applications.

Acoustic detections have a broad range of important applications across a wide frequency band, such as, aircraft structural health monitoring [1], early detection of clear-air turbulences [2] and various seismic events [3], submarine communications [4], identification of nuclear detonations [5], ballistocardiography, seismocardiography [6], ultrasound [7] and photoacoustic [8] imaging. Acoustic wave detectors to date are primarily dominated by piezoelectric and mechanical-based sensors. Piezoelectric-based detectors are highly susceptible to electromagnetic interferences. In addition, the detection ranges of piezo- and mechanical-based sensors are defined by the physical dimensions of the sensor materials. Thus, detectors for long acoustic wavelengths (infrasonic waves) demand a very large area [9]. Moreover, they need preamplifiers that consume additional space and power to detect acoustic signals. This clearly becomes a serious drawback when large arrays of such acoustic sensors are to be integrated in a space-constrained system with low-power requirement. Ultrasonic waves, on the other hand, have shorter acoustic wavelengths and can be detected by smaller size sensors. Ultrasound detection, however, requires an acoustic impedance matching materials, such as water, gel, or solid between the object under test (OUT) and detector. These acoustic impedance matching materials are necessary to reduce the acoustic coupling loss at the OUT and air or detector and air boundary and the large acoustic absorption of air at high frequencies. Both effects attenuate considerably the intensity of air-coupled soundwaves received by the detector. These acoustic losses make it difficult to perform ultrasound imaging when the OUT and ultrasound detector must remain contactless, such as imaging of sensitive wounds or dangerous samples, while dry environment must be maintained. Therefore, free-space ultrasensitive acoustic detectors to overcome the acoustic coupling and absorption losses is highly desirable. We propose to address the aforementioned issues of acoustic detection by demonstrating crystalline liquid-based optoacoustic sensors that can be employed to detect broadband acoustic signals via free-space coupling.

Optoacoustic detection techniques can be appealing alternatives to conventional soundwave detection methods. Optoacoustic detectors do not suffer from geometry-dependent electrical noise, and are immune towards electromagnetic interference. The operating frequency of the optoacoustic sensors is not restricted by the physical dimensions of the sensors. As a result, a broadband acoustic sensor may be fabricated on a very small substrate. This sensor design allows for the elimination of costly, large, and power-hungry preamplifiers while maintaining high-sensitivity at a broad frequency range.

Over the past decade, various optical ring resonators have been used as optoacoustic detectors, including polymer ring resonators on a chip [10-13], silicon/silicon nitride ring resonators on a thin membrane [14, 15], and fused silica microresonators [16]. Due to the high optical Q-factors of the whispering gallery mode (WGM), the ring resonator can achieve high pressure sensitivity. Ring resonators have a small form factor (typical ring diameter: 50-200 µm), which is advantageous in building an array of detectors in a miniscule platform. However, most of acoustic detection experiments using WGM ring resonators to date are performed in aqueous environment. Scientists recently demonstrated an air-coupled ultrasound detector using high Q-factor ($>10^7$) ring resonators based on fused silica capillaries [17]. These optical ring resonators were able to detect ultrasound waves up to 800 kHz, but the light coupling mechanism using tapered-fiber is impractical for many applications. Furthermore, bulky and expensive tunable lasers were necessary to obtain whispering-gallery resonances. Finally, the rigid fused-silica material was only modestly deformed due to acoustic stimulation. We propose to solve these issues by employing LC molecular cavities to perform optoacoustic detections.

Figure 1:
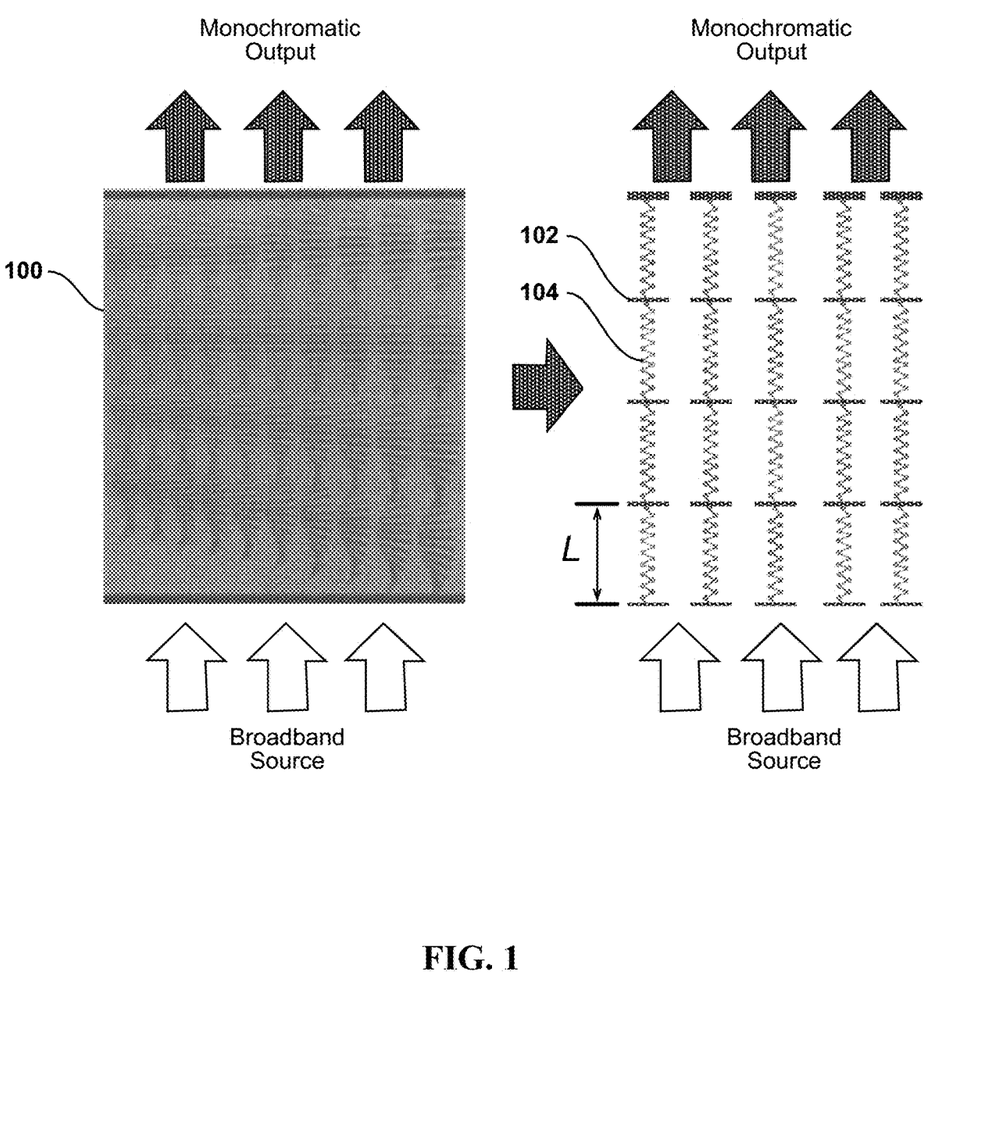
FIG. 1 is a schematic representation illustrating a liquid crystal cavity (LC) as arrays of periodic mirrors linked by molecular springs, according to one or more embodiments.

II. LIQUID-CRYSTALINE OPTOACOUSTIC CAVITY: FIG. 1 is a schematic representation illustrating a liquid crystal cavity (LC) 100 as arrays of periodic mirrors 102 linked by molecular springs 104. Liquid crystalline materials undoubtedly represent a most engrossing state of matter, combining liquid-like fluidity and crystal-like ordering. Importantly, being "soft" makes the materials responsive to various stimuli, such as acoustic pressures [18]. Certain type of cholesteric liquid crystals can be doped and aligned to form a soft tunable Bragg grating cavity that is naturally responsive to acoustic pressures as illustrated in FIG. 1. The spectral transition regime in the optical bandgap of the LC grating can be used to sense broadband acoustic waves.

The resonant wavelength ($\lambda_0$) of the LC cavity is given by $$\lambda_0 = 2 \cdot L \cdot n_{Eff} \quad (1)$$

where $n_{Eff}$ and L are the effective refractive index and period of the LC grating respectively. As soundwaves impact the LCs, the optical mode in the LC grating undergoes a spectral shift due to the changes in $n_{Eff}$ (photoelastic effect) and L (physical deformation) of the LC molecules. This can be expressed as $$\frac{\Delta \lambda}{\lambda} = \frac{\Delta n_{Eff}}{n_{Eff}} + \frac{\Delta L}{L} \quad (2)$$

The change in transmission intensity due to spectral shift can be detected most at the falling or rising edge of the optical resonance. A light source with a narrow wavelength may be matched, or locked, to this edge, which is enabled by a bandpass filter with a broad spectrum white light or via a laser light source. The time domain modulation of transmission intensity at the falling or rising edge of the resonance is then recorded by a photodetector and oscilloscope.

Figure 2A:
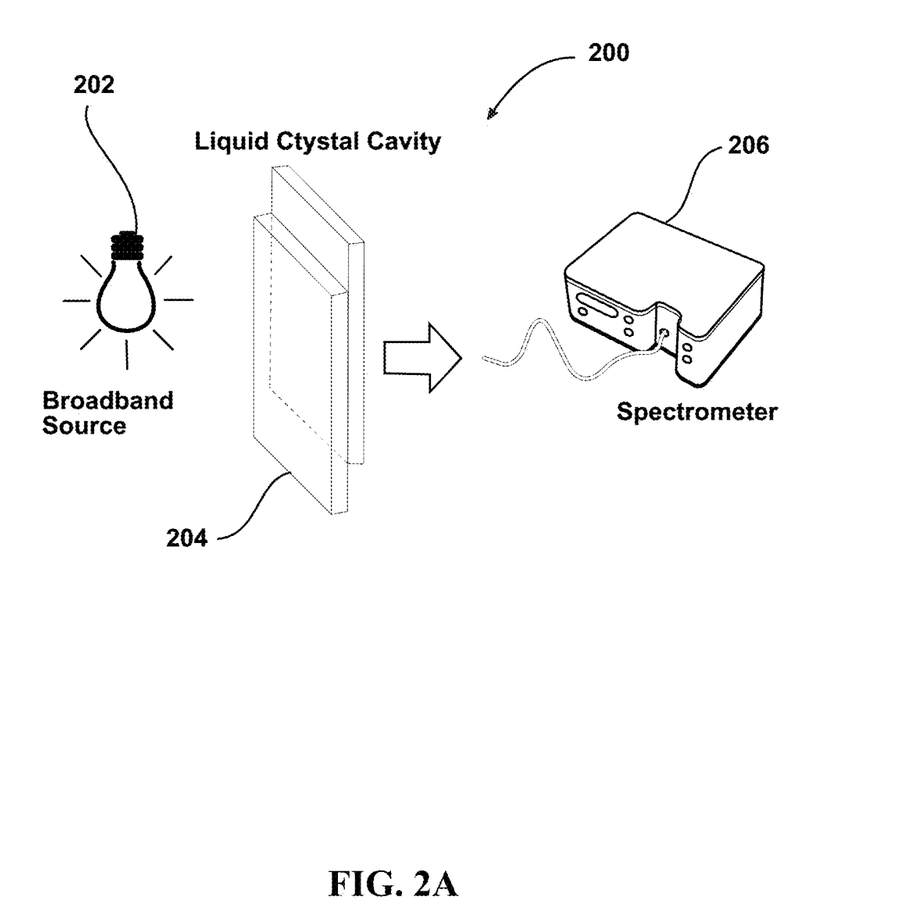
FIG. 2A is a representation illustrating the measurement setup to identify the optical resonance of the LC cavity, according to one or more embodiments.
Figure 2B:
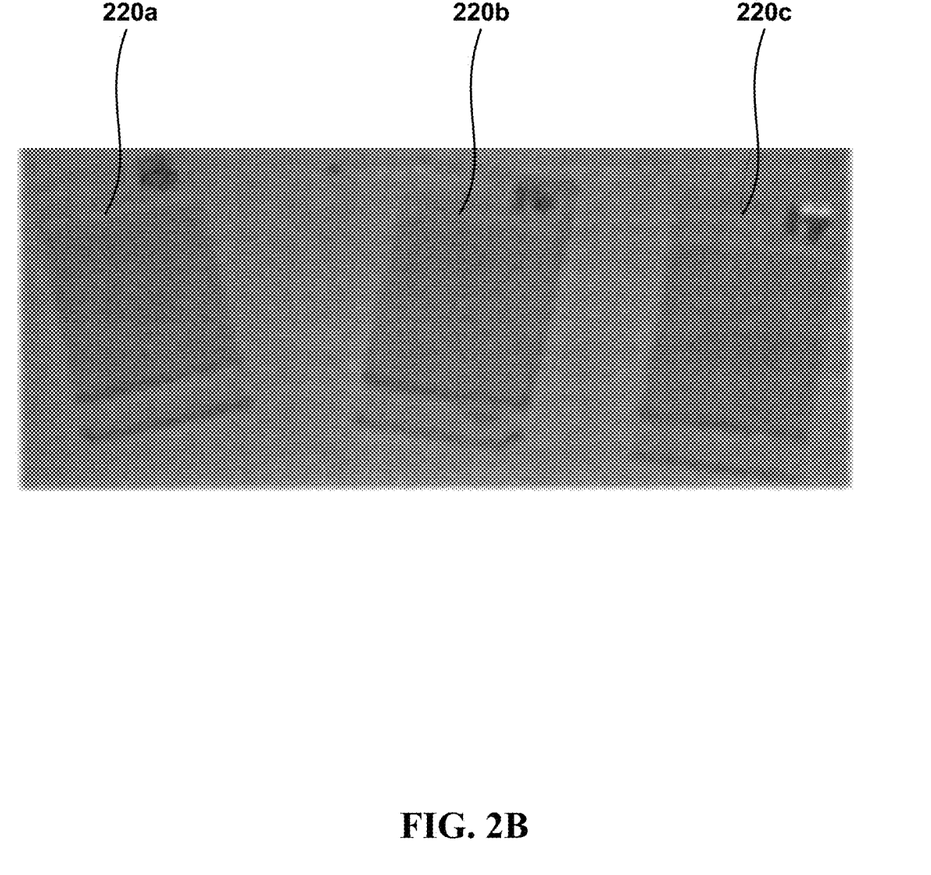
FIG. 2B is a representation of cholesteric liquid crystal cavities with 1.08%, 2.05%, and 2.56% by weight of chiral dopant, according to one or more embodiments.
Figure 2C:
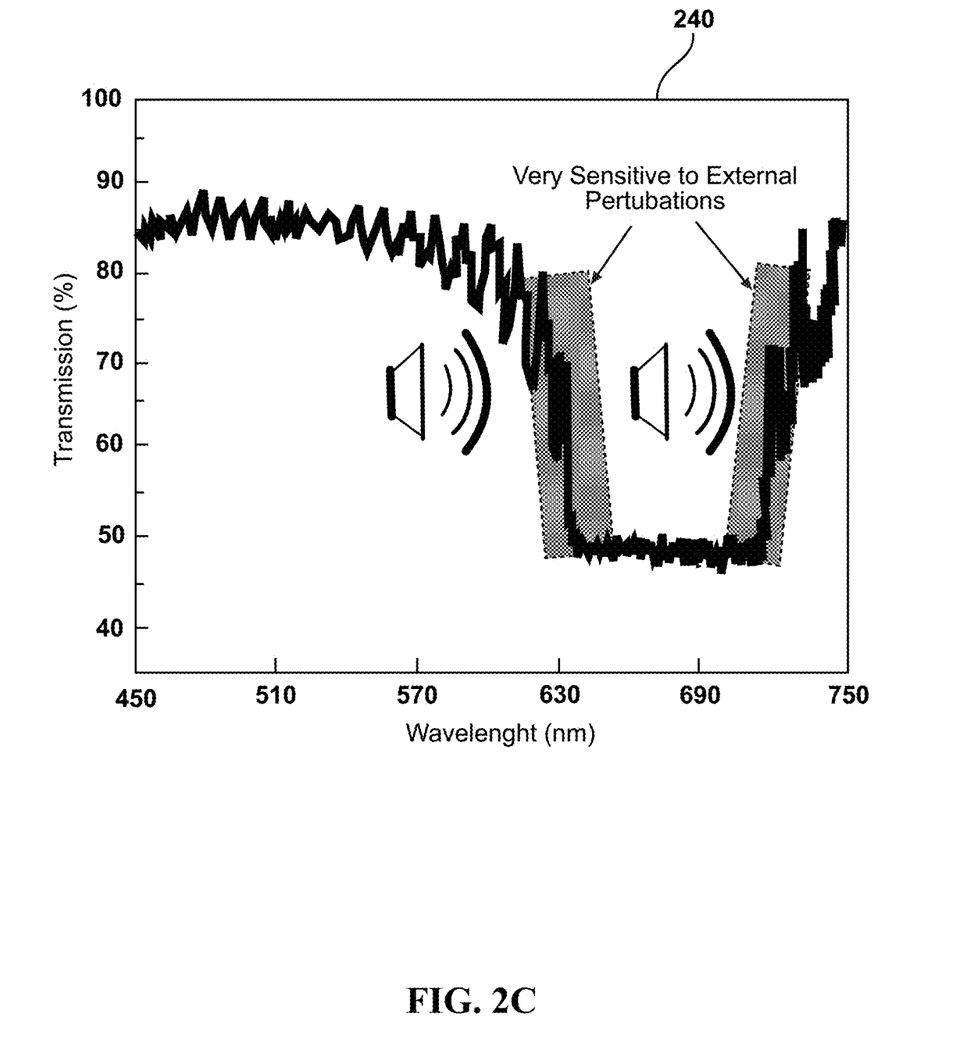
FIG. 2C is graphical plot representation of the measured resonance of the LC cavity with 2.05% by weight dopant, according to one or more embodiments.

III. CHARACTERIZATION OF LC OPTOACOUSTIC CAVITY: FIG. 2A is a representation illustrating a measurement setup 200 of a broadband source 202, an LC cavity 204, and a spectrometer 206. The optical bandgap of the LC cavity can be identified using the measurement setup described in FIG. 2A to identify the optical resonance of the LC cavity 204. FIG. 2B is a representation of cholesteric liquid crystal cavities 220a-220c respectively with 1.08%, 2.05%, and 2.56% by weight of chiral dopant. We prepared liquid crystal cells with different dopant concentrations as shown in FIG. 2B. FIG. 2C is graphical plot representation 240 of the measured resonance of the LC cavity with 2.05% by weight dopant The measured resonant wavelength (4) and slope (5) of the bandgap of the LC cavity with 2.05% wt dopant were approximately 675 nm and 5.9%/nm, respectively, as shown in FIG. 2C.

Figure 3A:
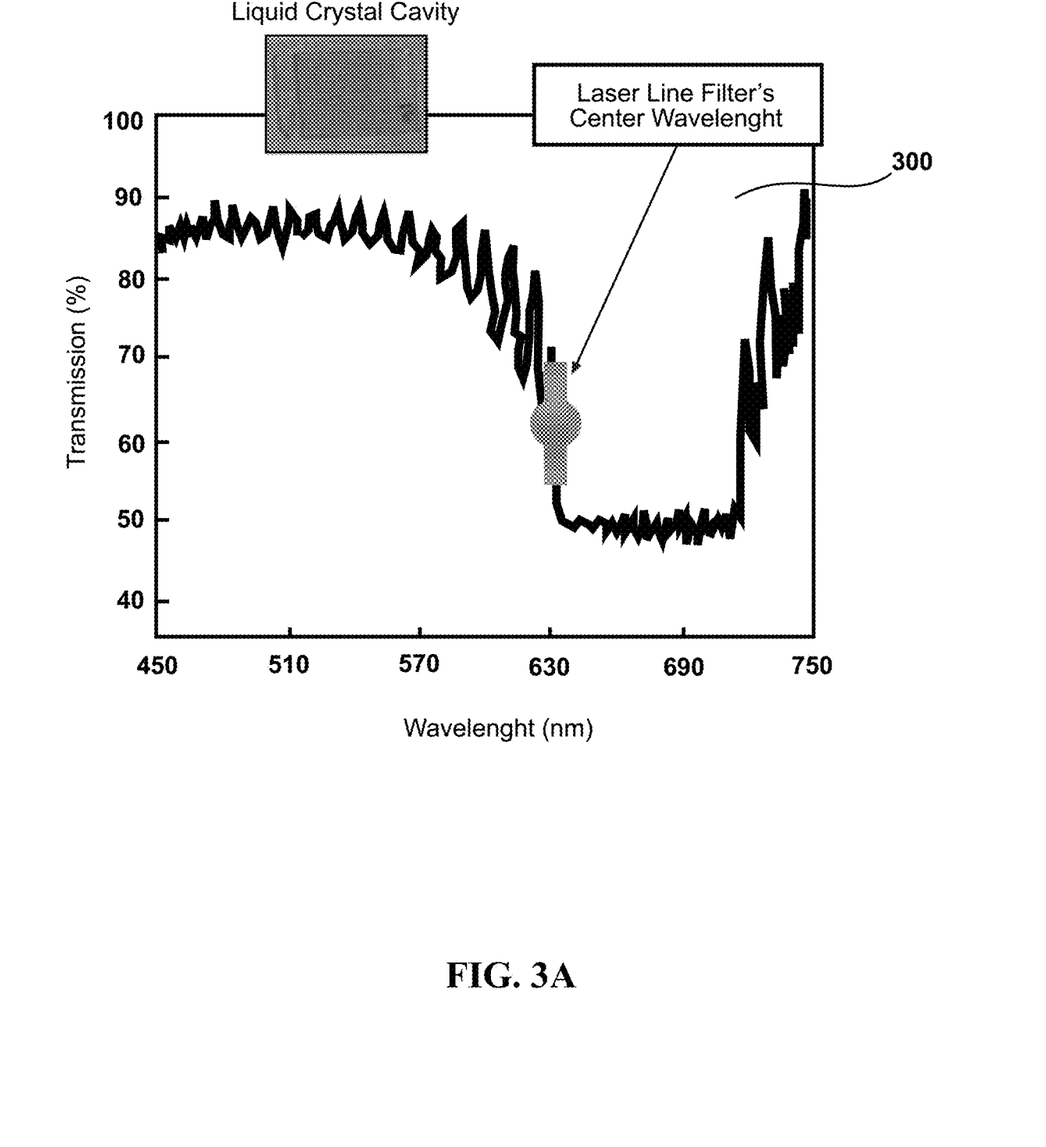
FIG. 3A is an isometric depiction illustrating a laser line filter that was used to produce a coherent input light at the most sensitive part of the LC transmission curve, according to one or more embodiments.

FIG. 3A is an isometric depiction 300 illustrating a laser line filter that was used to produce a coherent input light at the most sensitive part of the LC transmission curve. A laser line filter was employed to lock a coherent light at either the falling or raising edge of the resonance as depicted in FIG. 3A. An inset shows the LC cavity filled with 4-Cyano-4'-pentylbiphenyl+2% chiral dopant R5011. An amplified function generator in-line with an acoustic transducer emitted the acoustic waves. The optical intensity modulation due to acoustic waves was monitored by a photodetector according to the measurement setup described in FIG. 2B. As a reference, a G.R.A.S 46 BE acoustic sensor and preamplifier have been calibrated to convert accurately peak-to-peak voltage to peak-to-peak acoustic pressure.

Figure 4A:
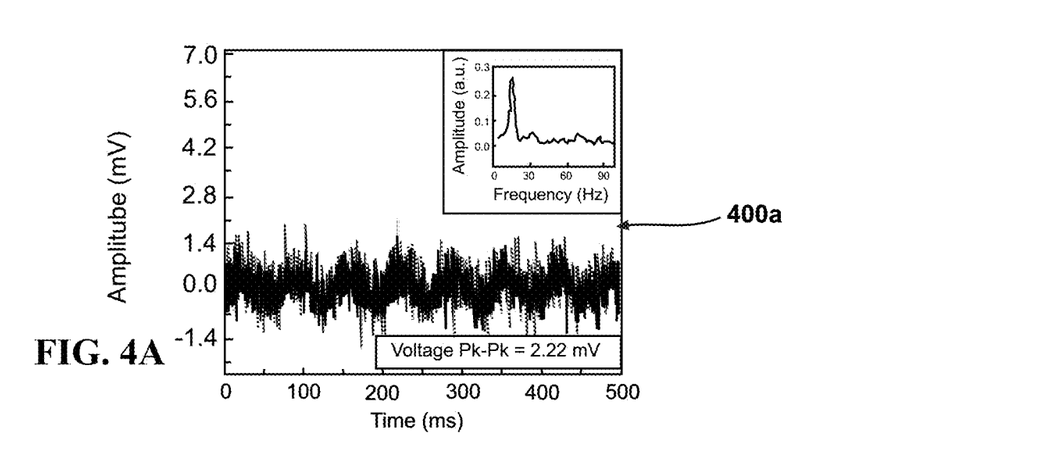
FIGS. 4A-4C are graphical plots of temporal spectra of acoustic waves respectively at (a) 15 Hz, (b) 14 kHz, and (c) 50 kHz respectively detected by the reference sensor G.R.A.S. 46BE, producing the corresponding peak-to-peak pressures detected by the reference sensor were 0.56, 3.05, and 0.50 Pa, according to one or more embodiments.
Figure 4B:
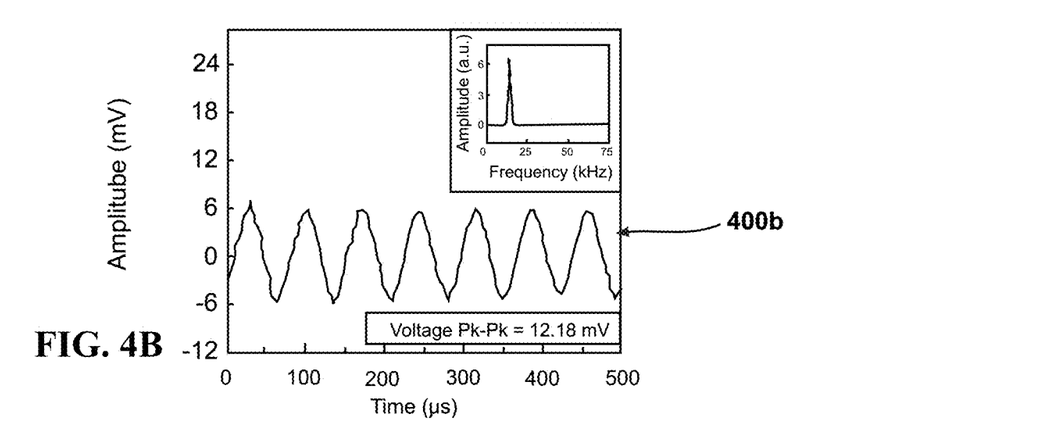
Figure 4C:
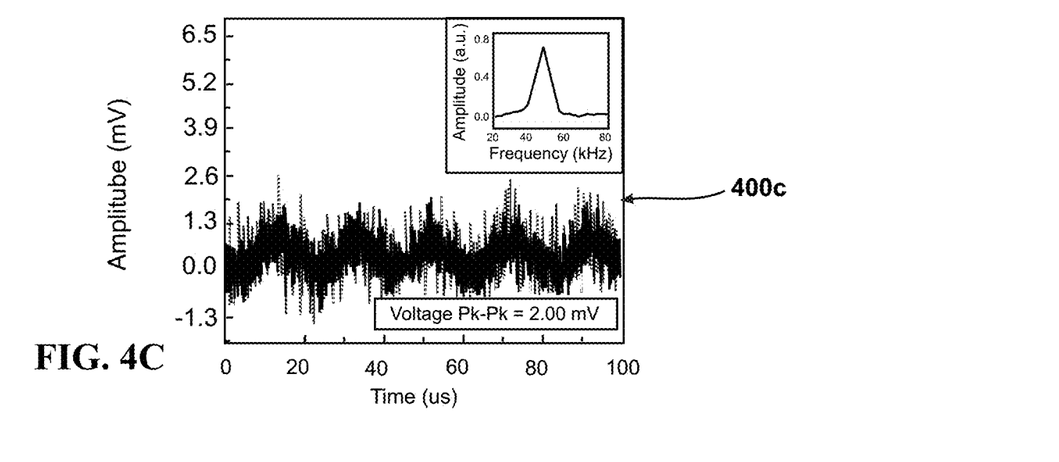

The LC cavity and G.R.A.S. detector were placed next to each other to experience the same acoustic pressures. An LED white light source was used instead of a laser to drive the LC cavity. A broadband source is generally more affordable, compact, and practical than a bulky, expensive laser. The light was filtered using a 632 nm laser line filter and measured via a photodetector, which yielded 1.2 mV voltage level. A broad frequency range was launched, which included infrasound to ultrasound. The recorded time-domain spectra detected by the reference detector were plotted in FIGS. 4A-4C. FIGS. 4A-4C are graphical plots 400a-400c respectively of temporal spectra of acoustic waves respectively at (a) 15 Hz, (b) 14 kHz, and (c) 50 kHz respectively detected by the reference sensor G.R.A. S. 46BE, producing the corresponding peak-to-peak pressures detected by the reference sensor were 0.56, 3.05, and 0.50 Pa.

The highly deformable LC is expected to dominate the change in wavelength compared to the photoelastic effect. The elastic property of the LC (specifically LCSCB) was estimated to be similar to that of water, while the LC viscosity (25 mPa·s) is roughly 25 times that of water [19]. Knowing that the mechanical stiffness constant of water is approximately 10 mN/m [20], the stiffness constant of the LC is 25 times 10 mN/m. The detected unamplified modulated light intensity can be analytically calculated and plotted in FIGS. 5A-5C, which uses the same relative acoustic pressures experienced by the G.R.A.S. sensor per frequency.

Pressure of the sound wave was found through converting the peak-to-peak voltage of the G.R.A. S. sensor using the given equipment documentation. The force of the pressure wave, F, was found using the definition of pressure, F=P*A, where P is pressure of the sound wave, and A is the surface area of the LC that was incident to the pressure wave. Hooke's law, F=$k_{eff}$*ΔL, was implemented to find a value for ΔL, the amount of distance the LC was displaced, or compressed, by the pressure wave. The variable $k_{eff}$ is the effective spring constant of LC.

Equation (2) was used to describe the spectral shift observed due to the physical deformation of the LC. However, in this calculation, ΔL is as previously defined above, and L is the initial distance between the top and bottom of the thin film of LC. The $\Delta n_{eff}/n_{eff}$ term is ignored, due to physical deformation dominating over the photoelastic effect, simplifying the equation to $$\frac{\Delta \lambda}{\lambda} = \frac{\Delta L}{L}, \quad (3)$$

in which Δλ may be calculated.

Figure 3B:
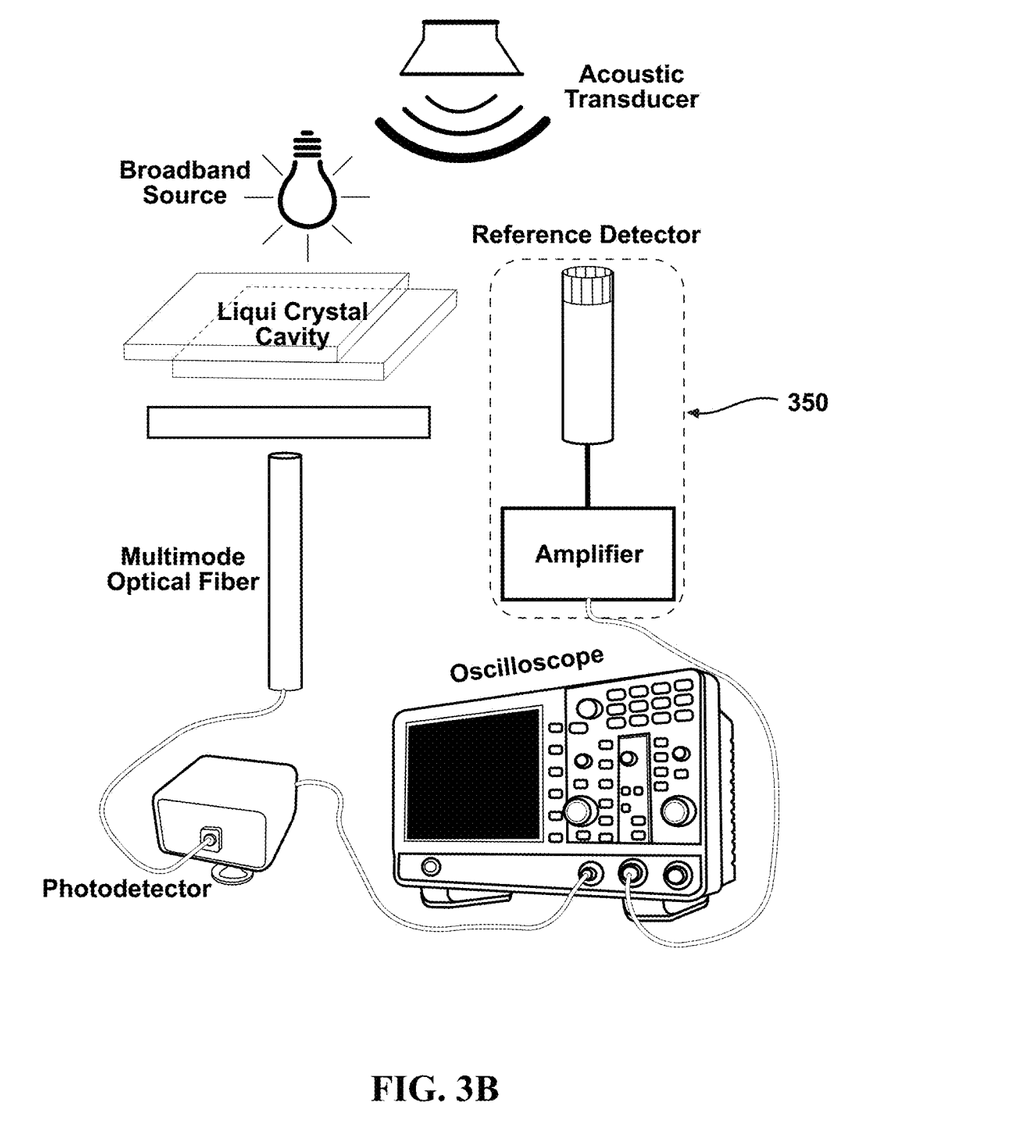
FIG. 3B is a schematic representation illustrating the optoacoustic measurement setup with a calibrated acoustic sensor, according to one or more embodiments.
Figure 5A:
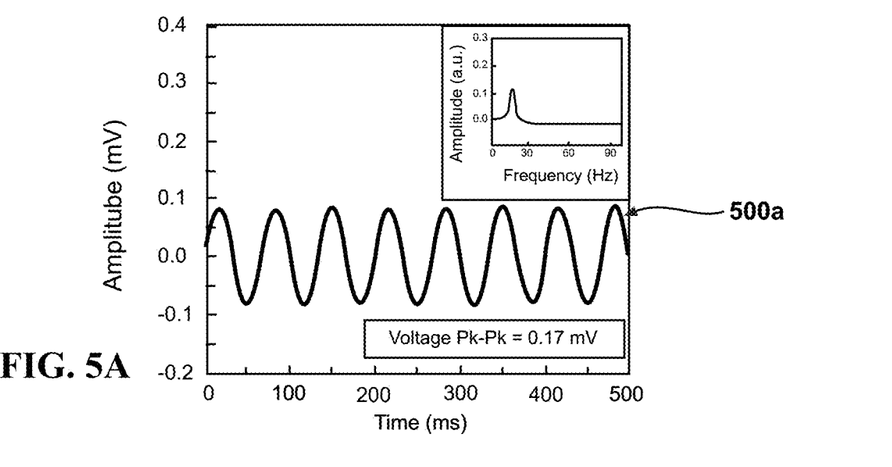
FIGS. 5A-5C are graphical plots of analytically estimated temporal spectra of acoustic waves respectively at (a) 15 Hz, (b) 14 kHz, and (c) 50 kHz respectively detected by the LC cavity, according to one or more embodiments.
Figure 5B:
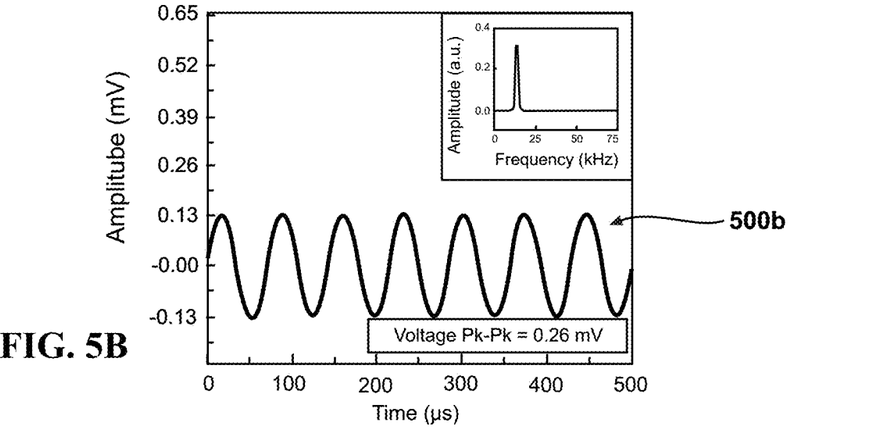
Figure 5C:
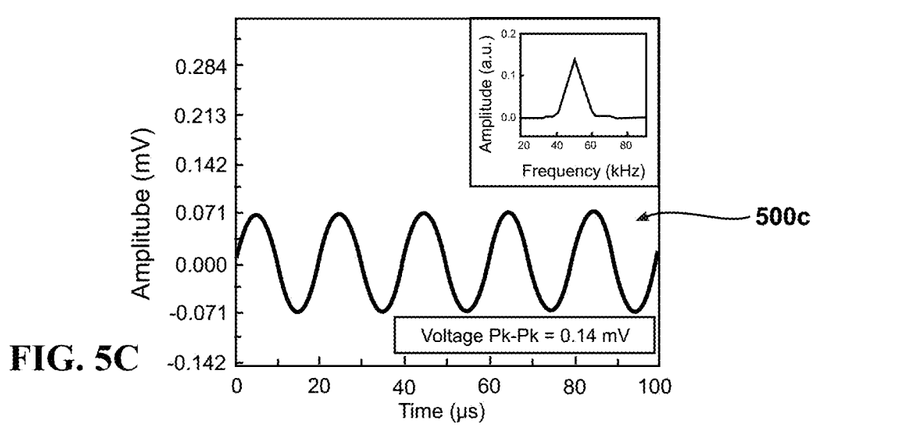

Using a measured optical bandgap and Δλ, the expected change in percent transmission may be found. A single point on the spectrum translates to a wavelength with a corresponding intensity, or percent transmission. When given a starting wavelength and tracing along the edge of the optical bandgap, a second wavelength and % transmission may be found. This simulates the moments when the LC is at rest and when it experiences the most pressure, respectively. The output modulation of the photodetector may then be analytically estimated by a voltage versus time plot as seen in FIG. 5. FIGS. 5A-5C are graphical plots 500a-500c respectively of analytically estimated temporal spectra of acoustic waves respectively at (a) 15 Hz, (b) 14 kHz, and (c) 50 kHz respectively detected by the LC cavity FIG. 3B is a schematic representation 350 illustrating the optoacoustic measurement setup with a calibrated acoustic sensor. The assumptions of these simulations were based on the limitations of the equipment available in FIG. 3B. The narrow bandpass filter (laser line filter) combined with the LED white light source emitted a wavelength of approximately 632 nm with a FWHM of 1 nm. This aligned with an edge of the measured optical bandgap. The initial 1.2 mV seen by the photodetector was measured when no pressure was exerted, the LC cavity was filled, and the laser line filter was present as seen in FIG. 3B.

The resulting G.R.A.S sensor voltages are greater than those of the LC cavity ranging from 13, 47, and 14 times greater at 15 Hz, 14 kHz, and 50 kHz, respectively. This is mainly due to the 1.2 mV detected intensity of the filtered white light source. Ideally, a light source with an intensity measurement greater than (16 mV to 56 mV) 4 to 8 times that of the G.R.A.S peak-to-peak voltage will yield a more sensitive LC cavity acoustic detector depending on frequency.

Research is ongoing to develop an LC cavity such that the pieces which physically touch the LC are an infinitesimally thin membrane. This will allow the acoustic wave to impinge more directly to the LC molecules without experiencing acoustic absorption of the host cavity. In addition, a light source with greater intensity, such as a laser, may yield a greater response than the commercial detector.

CONCLUSION: In summary, we have investigated the possibility of employing geometry-independent liquid crystalline materials to detect broadband soundwaves. We have explored the underlying theory and quasi-experimentally validated the potential of using liquid crystal cavities to sense acoustic pressures. The practical detection limit of our soft optoacoustic cavity was limited by the intensity of the light source and cavity host that significantly attenuate the sound pressures. Currently, work is underway to create LC hosts with infinitesimally thin membranes. Liquid-crystalline materials certainly exemplify such a marvelous dynamic system that combines the liquid-like softness, which is highly responsive to acoustic pressures and controllable crystal-like ordering that provides dynamic photonic bandgaps. These features are promising to generate numerous opportunities in the next generation contactless integrated broadband acoustic sensing and photoacoustic imaging.

REFERENCES: The following references cited above are hereby incorporated by reference in their entirety:

[1] J.-B. Ihn and F.-K. Chang, "Pitch-catch active sensing methods in structural health monitoring for aircraft structures," Struct. Health Monitor., vol. 7, pp. 5, 2018.

[2] E. S. Posmentier, "1-to 16-Hz infrasound associated with clear air turbulence predictors," J. Geophys. Res., vol. 79, pp. 1755, 1974.

[3] J. P. Mutschlecner and R. W. Whitaker. "Infrasound from earthquakes," J. Geophys. Res., vol. 110, pp. D01108, 2005.

[4] D. F. River and R. Bansal, "Towed antennas for US submarinecommunications: A historical perspective," IEEE Antennas and Propagation Magazine, vol. 46, pp. 23, 2004.

[5] D. P. Drob, J. M. Picone, and M. Garcés, "Global morphology of infrasound propagation," J. Geophys. Res., vol 108, pp. D21, 2003.

[6] 0. T. Inan, P.-F. Migeotte, K.-S. Park, M. Etemadi, K. Tavakolian, R. Casanella, J. Zanetti, J. Tank, I. Funtova, G. K. Prisk, and M. Di Rienzo, "Ballistocardiography and seismocardiography: a review of recent advances," IEEE J. Biomed. Health Inf., vol. 19, pp. 1414, 2015.

[7] A. Fenster, D. B. Downey, and H. N. Cardinal, "Three-dimensional ultrasound imaging," Phys. Med. Biol., vol. 46, pp. R67, 2001.

[8] L. H. V. Wang and S. Hu, "Photoacoustic tomography: in vivo imaging from organelles to organs," Science, vol. 335, pp. 1458, 2012.

[9] A. J. Bedard and T. M. Georges, "Atmospheric infrasound," Phys. Today, vol. 53, pp. 32, 2000.

[10] C. Zhang, S.-L. Chen, T. Ling, and L. J. Guo, "Review of imprinted polymer microrings as ultrasound detectors: design, fabrication, and characterization," IEEE Sensors J., vol. 15, pp. 3241, 2015.

[11] H. Li, B. Dong, Z. Zhang, H. F. Zhang, and C. Sun, "A transparent broadband ultrasonic detector based on an optical micro-ring resonator for photoacoustic microscopy," Sci. Rep., vol. 4, pp. 4496, 2014.

[12] S. Ashkenazi, C.-Y. Chao, L. J. Guo, and M. O'Donnell, "Ultrasound detection using polymer microring optical resonator," Appl. Phys. Lett., vol. 85, pp. 5418, 2004.

[13] T. Ling, S.-L. Chen, and L. J. Guo, "Fabrication and characterization of high Q polymer micro-ring resonator and its application as a sensitive ultrasonic detector," Opt. Express, vol. 19, pp. 861, 2011.

[14] S. Leinders, W. Westerveld, J. Pozo, P. van Neer, B. Snyder, P. O'Brien, H. Urbach, N. de Jong, and M. Verweij, "A sensitive optical micro-machined ultrasoundsensor (OMUS) based on a silicon photonic ring resonator on an acoustical membrane," Sci. Rep., vol. 5, pp. 14328, 2014.

[15] G. N. De Brabander, J. T. Boyd, and G. Beheim, "Integrated optical ring resonator with micromechanical diaphragms for pressure sensing," IEEE Photon. Technol. Lett., vol. 6, pp. 671, 1994.

[16] M. V. Chistiakova and A. M. Armani, "Photoelastic ultrasound detection using ultra-high-Q silica optical resonators," Opt. Express, vol. 22, pp. 28169, 2014.

[17] K. H. Kim, W. Luo, C Zhang, C Tian, L. J. Guo, X. Wang, and X. Fan, "Air-coupled ultrasound detection using capillary-based optical ring resonators," Sci. Rep., vol. 7, pp. 109, 2017.

[18] L. Wang and Q. Li, "Stimuli-directing self-organized 3D liquid-crystalline nanostructures: from materials design to photonic applications," Adv. Funct. Mater., vol. 26, pp. 10, 2016.

[19] X. Qiao, X. Zhang, Y. Guo, S Yang, Y Tian, and Y. Meng, "Boundary layer viscosity of CNT-doped liquid crystals: effects of phase behavior," Rheol. Acta, vol. 52, pp. 939, 2013.

[20] Q. Ni, T. Marschke, S. Steele, N. Seyed, and N. B. Crane, "Studying of Contact Angle Friction and Contact Angle Hysteresis (CAH) Though Force Measurements," In ASME 2012 International Mechanical Engineering Congress and Exposition, pp. 721, 201.

Additional information is provided in "Influence of statistical process in designing liquid crystalline optical cavities" by Michael T. Dela Cruz, Ling Wang, and Hengky Chandrahalim, which is hereby incorporated by reference in its entirety and which is expressly incorporated in priority U.S. Provisional Application Ser. No. 62/803,630 entitled "Noncontact Liquid Crystalline Broadband Optoacoustic Sensors".

Additional information is provided in "Designing Liquid Crystal For Optoacoustic Detection", a thesis by Michael T. Dela Cruz, Air Force Institute of Technology, AFIT-ENG-MS-19-M-023, which is incorporated by reference in its entirety and expressly included in priority document U.S. Provisional Application Ser. No. 62/964,752 entitled "Noncontact Liquid Crystalline Broadband Optoacoustic Sensors".

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

The invention claimed is:

1. An optoacoustic sensor comprising:
   a top plate formed of optically transparent material;
   a bottom plate formed of optically transparent material;
   a thin film spacing layer sandwiched between the top plate and the bottom plate surrounding a liquid crystal (LC) cell formed between the top plate and the bottom plate;

a transverse grating formed across the LC cell that forms an optical transmission bandgap;

an LC comprising a selected one of: (i) a cholesteric liquid crystal (CLC); (ii) a doped liquid crystal (DLC) that fills the CL cell that is aligned to form a spring-like, tunable Bragg grating that is naturally responsive to external agitations providing a spectral transition regime, or edge, in the optical transmission bandgap of the transverse grating that respond to broadband acoustic waves;

a narrowband light source that is oriented to transmit light through the top plate, the LC cell, and the bottom plate; and an optoacoustic spectrometer that is oriented below the bottom plate to receive the transmitted light and to record a time-domain modulation of transmission intensity at a selected one of a falling and rising edge of the transmission bandgap for detecting analog acoustic vibration.

2. The optoacoustic sensor of claim 1, wherein the narrowband light source comprises a broad-spectrum white light and a narrow optical bandpass filter that filters the light emitted by the broad-spectrum white light source.

3. The optoacoustic sensor of claim 1, wherein the narrowband light source comprises a laser light source.

4. The optoacoustic sensor of claim 1, wherein the LC comprises DLC resulting from dissolving a chiral dopant molecule into an achiral nematic LC host.

5. The optoacoustic sensor of claim 1, wherein the chiral dopant molecule has a dopant concentration by weight in a range between 1.80% and 2.56% relative to the achiral nematic LC host.

6. The optoacoustic sensor of claim 5, wherein the dopant concentration by weight is 2.05% maximizes transmission bandgap slope performance.

7. The optoacoustic sensor of claim 1, wherein the top plate and the bottom plate comprise glass plates spaced by 3.1 μm.

* * * * *